United States Patent
Pouteau et al.

(10) Patent No.: US 6,320,999 B1
(45) Date of Patent: Nov. 20, 2001

(54) OPTICAL MICROSTRUCTURE POSITIONING SYSTEM

(75) Inventors: Patrick Pouteau, Voreppe; Pierre Labeye, Grenoble, both of (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/156,912

(22) Filed: Sep. 18, 1998

(30) Foreign Application Priority Data

Oct. 6, 1997 (FR) .................................................. 97 12423

(51) Int. Cl.⁷ .............................. G02B 6/26; G02B 6/42
(52) U.S. Cl. .................................... 385/23; 385/22; 385/16
(58) Field of Search .................... 385/22, 23, 16

(56) References Cited

U.S. PATENT DOCUMENTS

| | | | |
|---|---|---|---|
| 4,607,910 | * 8/1986 | Thurenius | 350/96.2 |
| 4,705,349 | 11/1987 | Reedy . | |
| 5,214,727 | 5/1993 | Carr et al. . | |
| 5,239,599 | * 8/1993 | Harman | 385/16 |
| 5,261,015 | * 11/1993 | Glasheen | 385/23 |
| 5,990,473 | * 11/1999 | Dickey et al. | 250/231.13 |
| 6,044,186 | * 3/2000 | Chang et al. | 385/23 |

FOREIGN PATENT DOCUMENTS 0712004   5/1996 (EP) .
6-148536  5/1994 (JP) .

OTHER PUBLICATIONS

Patent Abstracts of Japan vol. 098, No. 001, 30 janvier 1998 & JP 09 251135 A. (Fujikura Ltd), Sep. 22, 1997.
Patent Abstracts of Japan vol. 097, No. 007, 31 juillet 1997 & JP 09 080329 A ( Nippon Telegr & AMP; Teleph Corp ≪NTT>), 28 mars 1997.
Abstract translation of FR2725038.
Descriptive Abstract—Translation of EP–A–0712 004 Corresponding to U.S. application Ser. No. 08/549,970.
Abstract translation of JP 6–148536.

* cited by examiner

*Primary Examiner*—Frank G. Font
*Assistant Examiner*—Layla Lauchman
(74) *Attorney, Agent, or Firm*—Burns Doane Swecker & Mathis LLP

(57) ABSTRACT

A positioning system for an optical microstructure (64) in a devise (6) operating under the action of a control means includes a flexible element (63) supporting the optical microstructure and connected to the device. The orientation of the flexible element with respect to the device can be varied under the action of control means in order to put the optical microstructure (64) into at least one determined position. The flexible element is immobilized with respect to the device in order to hold the optical microstructure (64) in the determined position when the control means no longer act.

20 Claims, 4 Drawing Sheets

OPTICAL MICROSTRUCTURE POSITIONING SYSTEM

TECHNICAL DOMAIN

The invention relates to the domain of optical microstructures and microtechnologies. In particularly it relates to the domain of integrated optical switches. It also relates to the domain of optomechanical micro-devices, for example microdeflectors.

STATE OF PRIOR ART

Document FR-A-2 660 444 divulges an optical microstructure composed of an optical switch. It includes a description of the optical switch represented in FIG. 1 attached. This device receives an incident light beam I transported by fiber 2 and transmits a switched beam C either towards fiber 4 or towards fiber 6. Switch 1 comprises a guide structure formed on a substrate 12 with an entry surface E and an exit surface S. It comprises an entry microguide 18 and two exit microguides 20 and 22. In this example, microguides 18 and 20 are parallel to a direction x parallel to the largest surface 8a of the guide structure. Microguides 18 and 20 are laid out such that one continues on from the other and on each side of a recess 24 passing though the guide structure and extending into the substrate.

The exit microguide 22 located on the same side as the recess 24 and the microguide 20 and adjacent to this microguide, comprises a part 21 parallel to microguide 20 in this example on the exit side S of the switch, and a part 23 forming an elbow A with part 21, on the side of the hollow part 24. Thus the entry ends 20a and 22a of the exit microguides 20 and 22 respectively opening into hollow part 24, are closer to each other than their exit ends, flush with the exit surface S of the guide structure.

Hollow part 24 defines a flexible beam 26 oriented at rest parallel to the x direction. This beam 26 can deform in hollow part 24 along a y direction, parallel to the surface 8a of the guide structure and perpendicular to the x direction. This beam 26 has a fixed end 28 fixed to the guide structure and substrate 12, and a free end 30 capable of deforming in hollow part 24. The beam 26 is defined in the guide structure and is provided with a central microguide 32 extending over its entire length and, at rest, oriented parallel to the x direction. This central microguide 32 is placed along the continuation of the entry microguide 18 such that their longitudinal axes parallel to the x direction are coincident.

The incident beam transported by the entry microguide 18 is switched towards the exit microguide 20 by bringing the free end 32a of the central microguide of the beam facing and coincident with the entry end 20a of the exit microguide 20. Similarly, the incident beam transported by the entry microguide 18 is switched to the exit microguide 22 by bringing the free end 32a on the central microguide facing and coincident with the entry end 22a of the exit microguide 22. This second configuration is shown in FIG. 1.

For example, deformations of the beam to make end 32a of the central microguide coincide either with end 20a of the exit microguide 20, or with end 22a of microguide 22, are made using variable capacitors. This is done by applying metallizations 36 and 46 to each of the lateral surfaces of hollow part 24 on the guide structure 8 oriented along the x direction. Furthermore, metallizations 38 and 44 are applied to each of the lateral surfaces of the facing beam 26 oriented along the x direction when it is at rest. The facing metallizations 36 and 38 form the armatures of a first variable capacitor to which a voltage can be applied using an electrical power supply source 40 electrically connected to these armatures through conductors 42 placed on the surface 8a of the guide structure. Similarly, facing metallizations 44 and 46 form the armatures of a second variable capacitor to which a voltage can be applied using an electricity power supply source 48 connected using conducting wires 50 placed on the surface 8a of the guide structure.

Application of an appropriate voltage to the terminals of these capacitors creates an electrostatic force parallel to the y direction and causing deformation of the beam 26 along this y direction.

This type of optical switch may be made from a semiconducting substrate using microelectronics methods. These methods can collectively obtain integrated optical switches.

At the present time, the problem of precise positioning of the optical switching microguide has been solved, either by controlling the control force on the moving beam or by bringing two etching planes into contact (in other words as a limit stop). The first solution makes it necessary to be able to apply a constant force and/or servocontrol the applied force as a function of a parameter representing the position. The second solution is sensitive to lateral under-etching and over-etching of the mechanical structure.

The optical switching microguide is only held in position by maintaining the force applied to the beam, which requires energy consumption to maintain this force. If an electrostatic force is applied, as in the case of the device shown in FIG. 1, once the capacitor has been charged it is still necessary to prevent it from becoming discharged in the long term.

DESCRIPTION OF THE INVENTION

The invention is designed to solve these problems by proposing a system for positioning an optical microstructure in a device under the action of control means, comprising an element supporting the optical microstructure and connected to the device, the orientation of the said element with respect to the device varying under the action of control means in order to put the optical microstructure in at least one determined position, mechanical means of fixing the said element in position with respect to the device being provided to hold the optical microstructure in the said determined position.

Advantageously, the mechanical immobilization means are designed to release the said element under the action of the control means.

Preferably, the mechanical immobilization means comprise a male part and a female part with a shape complementary to the male part, one of the said parts belonging to the said element and the other part belonging to the device, the microstructure being held in the said determined position by the male part penetrating into the female part. According to one preferred embodiment, the male part and the female part have axes of symmetry parallel to the optical axis of the optical microstructure. Thus, when the microstructure is immobilized, the axes of symmetry of the male and female parts are superposed and an over-etching or under-etching defect in the male or the female part has no incidence on the precise positioning of the microstructure. Operation is better if the male part has a pointed cross section, the female part being a housing with a complementary shape. The said element may comprise at least one beam, called the main beam, connected by one of its ends to the device and its other end being free. It may then comprise at least one secondary beam placed transversally with respect to the main beam and rigidly attached to the main beam, the secondary beam supporting one of the said parts of the mechanical immobilization means. Preferably, this secondary beam is located at the free end of the main beam. The secondary beam may be fixed by one of its ends to the main beam, its other end being free and comprising one of the said parts of the mechanical immobilization means, for example the male part. The secondary beam may be such that it does not deform during displacement of the microstructure under the action of the control means.

The control means may be capacitive devices developing an electrostatic force in response to an electrical control voltage. They may also be magnetic and/or piezoelectric means. They position the element in the determined position.

In some cases control means may also be used to cooperate with the mechanical means to hold the element in position.

The invention may be applied to the manufacture of an integrated optical switch, the optical microstructure being an optical microguide. It may also be applied to the manufacture of a device with a lens that can be oriented into at least one determined position, the optical microstructure being the said lens. It may also be applied to the manufacture of a device with an optical fiber orientable into at least one determined position, the optical microstructure being the said optical fiber. Finally, it may be applied to the manufacture of a device with a mirror orientable into at least one determined position, the optical microstructure being the said mirror.

BRIEF DESCRIPTION OF THE FIGURES

The invention will be better understood and other advantages and specific features will become apparent by reading the following description, given as a non-restrictive example, accompanied by the drawings in the appendix in which.

DETAILED DESCRIPTION OF EMBODIMENTS OF THE INVENTION

Figure 1:
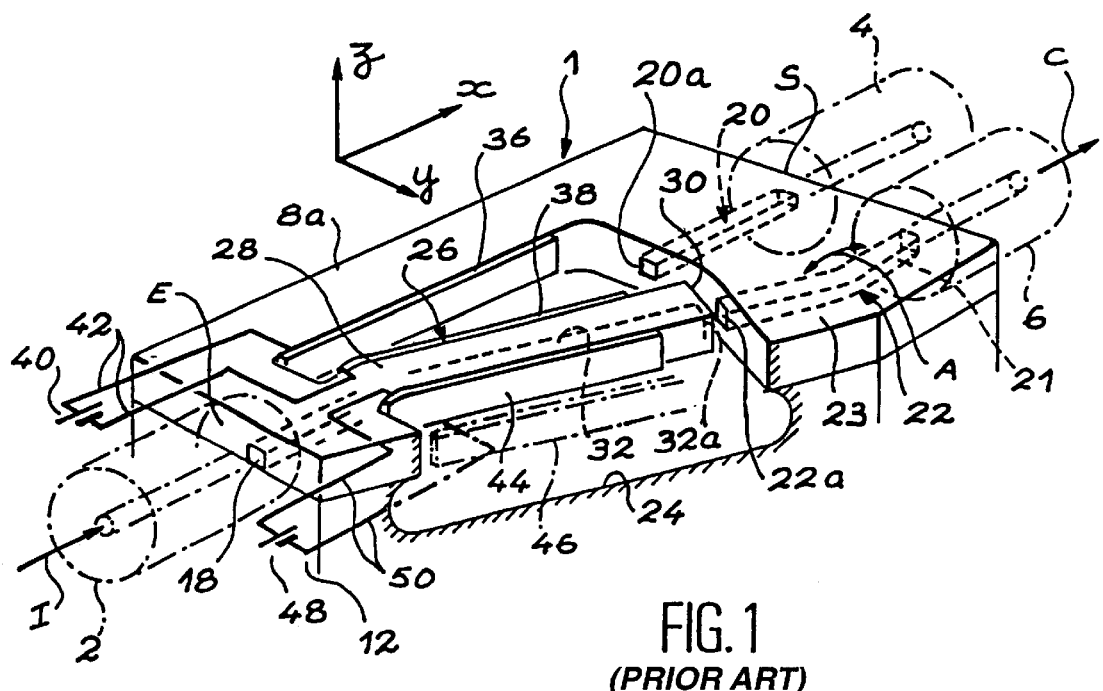
FIG. 1 is a perspective view of an integrated optical switch according to known art.
Figure 2:
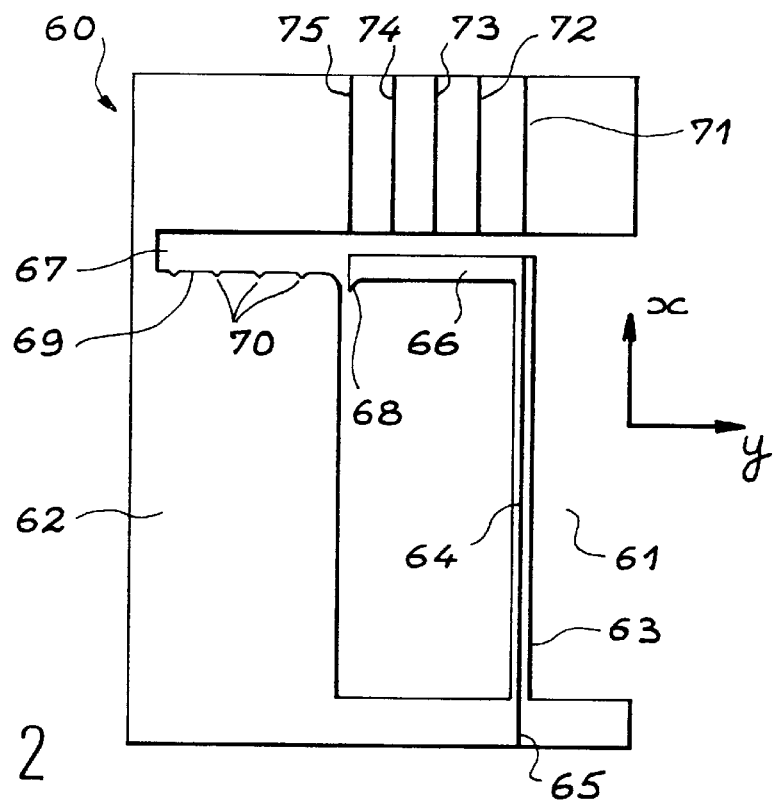
FIGS. 2 and 3 are top views of an integrated optical switch made according to this invention, and in different switching states.
Figure 3:
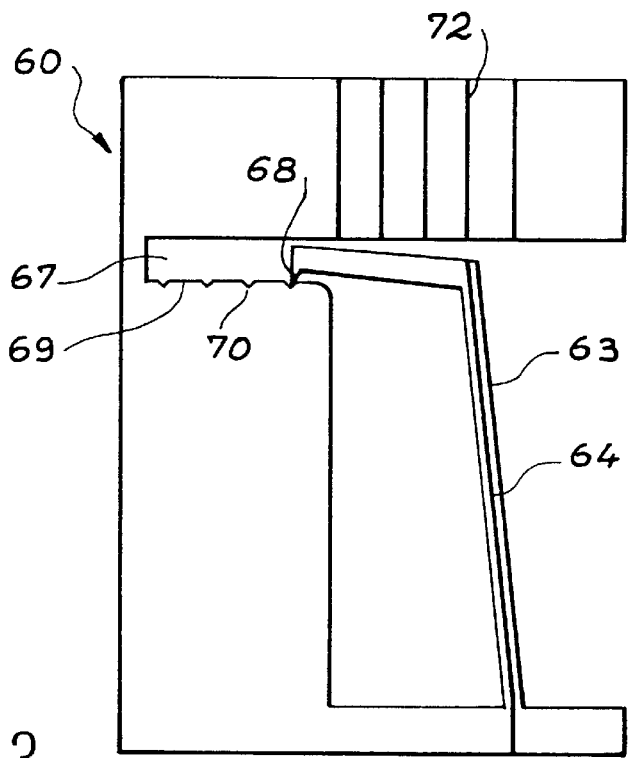

FIGS. 2 and 3 show a top view of an optical switch according to the invention, in two different switching states. This switch is of the same type as that shown in FIG. 1, in other words it comprises an orientable beam and it is made using micro-electronics techniques. For example, its manufacturing process could be of the type that is described in document FR-A-2 660 444. FIGS. 2 and 3 show schematic representations of the invention, to facilitate understanding it. In particular, the dimensions and proportions of the various beams are not to scale.

The optical switch 60, shown in FIGS. 2 and 3, comprises a recess 61 called the main recess, formed in the upper part 62 of the substrate on which the switch was formed. A beam 63, called the main beam is attached by one of its ends to part 62, and bends to move into the main recess 61. The main beam 63 comprises an optical microguide 64 over its entire length. This optical microguide 64 is continuous with the optical microguide 65 in part 62. The optical microguide 65 transports the optical signal to be switched to five possible outputs: optical microguides 71 to 75 formed in part 62 and in the plane of the microguides 64 and 65. The microguide 71 is aligned with microguide 64; microguides 72 to 75 are offset from this alignment.

The free end of the main beam 63 extends transversely through a secondary beam 66. Similarly, the main recess 61 extends along the center line of the secondary beam 66 into a secondary recess 67 into which the secondary beam 66 can fit.

The free end of the secondary beam 66 comprises a part 68 with a pointed cross section called the male part. The edge 69 of the secondary hollow part 67 facing the male part 68 is provided with recesses 70 called the female parts. The shape of the recesses 70 is complementary to the shape of the male part 68. There is one recess 70 for each offset exit microguide.

The free end of the beam 63 moves under the action of a lateral force exerted on the main beam 63 in the direction of the secondary recess 67, pulling the secondary beam 66 into the secondary recess 67. The main beam 63 deflects more or less, as a function of the amplitude of the force applied on it. The lateral force is chosen such that the male part 68 engages in one of the female parts or recesses 70. The separation between the recesses 70 corresponds with the separation between the optical exit guides 71 to 75 such that the exit from the optical microguide 64 on the main beam 63 is facing the entry to one of the microguides 72 to 75.

Once the male and female parts are engaged, the main beam 63 remains in the deformed position. The applied lateral force may be eliminated. Another lateral force applied to the main beam enables switching to another optical exit microguide.

The lateral force may be an electrostatic force obtained by application of a voltage between electrodes as described in document FR-A-2 660 444.

FIG. 2 shows the switch according to the invention when the main beam is not deformed. In this case, the microguide 64 is aligned with microguide 71. FIG. 3 shows the same switch when the main beam is deformed such that the microguide exit 64 is facing the entry to microguide 72. In this case, the male part 68 is engaged in the first recess 70 of the edge 69 of the secondary recess 67.

The main beam 63 may be moved by applying a force on this beam exceeding the sum of the elastic return force for the main beam and the sliding friction force of the male part 68 on the edge 69. Possibly, a force may be applied in the x direction on the secondary beam 66 in order to reduce the coefficient of sliding friction between the male part 68 on the edge 69. This force actually pulls the male part out of its recess, regardless of its shape.

Figure 4:
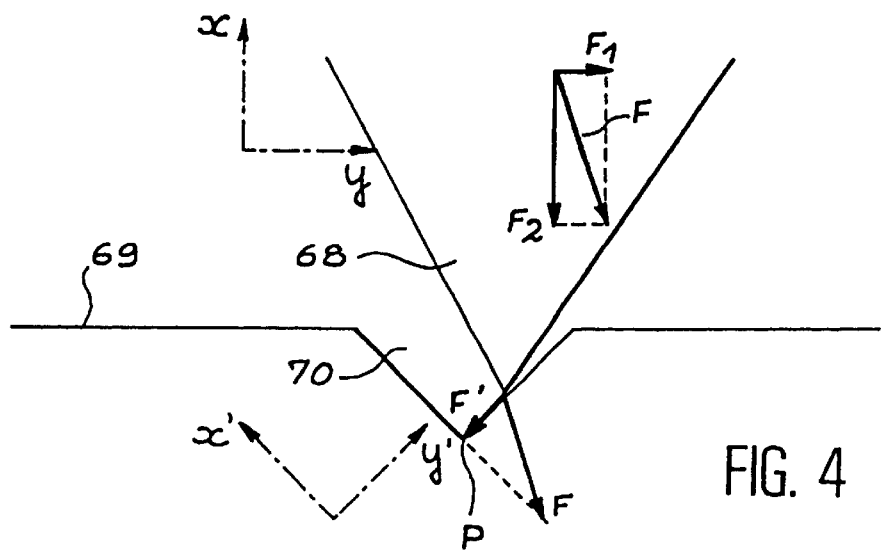
FIG. 4 is an explanatory view showing operation of the positioning system according to this invention.

The distribution of forces involved is shown in more detail in FIG. 4. When the male part 68 is facing a recess 70, all the applied forces can be canceled. The elasticity of beams 63 and 66 creates a return force F that can be broken down into a force $F_1$ in the y direction and force $F_2$ in the -x direction. The design of the two beams must be such that the sum of these two forces has a component F' that exceeds the sliding friction force between the male part 68 and the local surface dS in the -y' direction. This means that the top of the male part can remain in the recess 70 and move towards point P. It is held in place by the equilibrium of forces when the tip is at the bottom of its recess. The optical microguide 64 forming the microstructure is then in the required position, entirely determined by the etching mask that was used to make the switch.

In some cases, the support for the male part in its recess may be reinforced by the application of an additional force generated by the control means and applied to the secondary beam 66 in the -x direction.

The position of the main beam may be modified by adding an external force to forces $F_1$ and/or $F_2$ to modify the force ratio.

The tip of the cross section of the male part may be pointed, rounded or any other shape. A symmetric pointed cross section is the most advantageous.

The action of lateral under-etching or over-etching does not fundamentally change the state of equilibrium when the male part is in one of its recesses. In particular, the position of the male part along the y axis when in its recess remains the same.

So long as the mechanical surfaces remain in contact (male part in the recess), there is no variation in the coupling. The system should be less sensitive to vibrations. The optical microstructure remains in its position as long as the inertia forces generated by vibrations or any other cause do not modify the ratio of the forces.

For example, the dimensions of the various parts of the system according to the invention may be as follows:

for a beam 63 made of silica: width 50 µm and length 2 mm, for beam 66: width 75 µm and length 300 µm, height of the male part: 15 µm, angle of the symmetric pointed cross section for the male part: 45°.

angle of the cross-section of the symmetric recess: 9°.

spacing between recesses: 15 µm.

Figure 5:
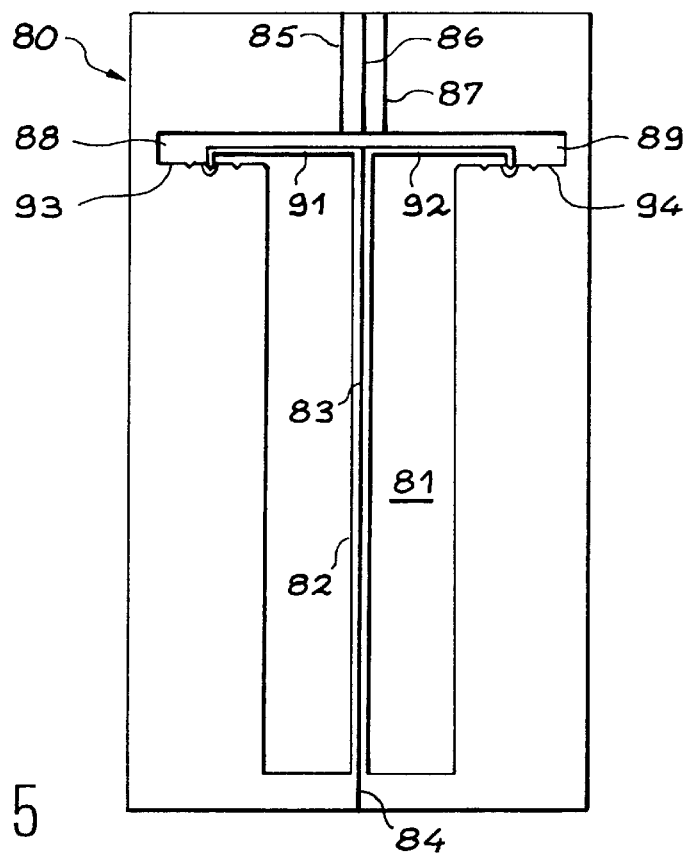
FIG. 5 is a top view of another variant of the integrated optical switch according to this invention.

FIG. 5 shows another variant embodiment of an integrated optical switch according to the invention. The positioning system for this optical switch has the special feature that it is symmetric. The switch 80 has a main recess 81 that defines a main beam 82 comprising an optical microguide 83 continuous with the entry optical microguide 84. This switch has three possible outputs, namely optical microguides 85, 86 and 87. The exit microguide 86 is normally aligned with microguides 83 and 84 when no forces are applied to main beam 82. Exit microguides 85 and 87 are located on each side of microguide 86. Recess 81 is extended towards the free end of the main beam 82, by two secondary recesses 88 and 89 with axes perpendicular to the axis of the main recess 81 located on each side of this main recess. Similarly, two secondary beams 91 and 92 extend perpendicular to the main beam 82. Each secondary recess 88 and 89 has edges 93, 94 provided with recesses into which fit the male parts terminating secondary beams 91 and 92.

When the secondary beams are made in the same part as the rest of the structure, the recesses into which the male parts fit when beam 82 is in its rest position must be widened so that male parts can be detached during their manufacture.

Capacitors may be made by metalizing the edges of beam 82 and the opposite edges of the recess 81. It is thus possible to develop electrostatic forces on beam 82 by the application of an electric voltage, as described in document FR-A-2 660 444.

Figure 6:
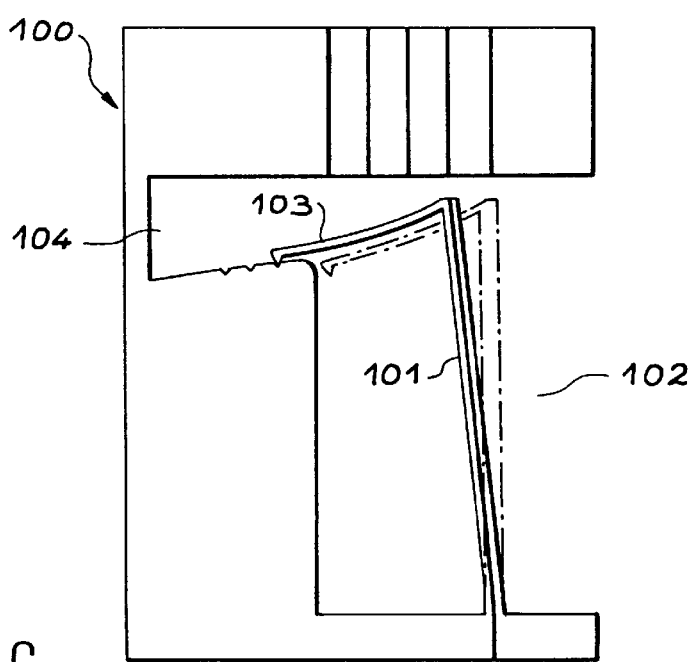
FIG. 6 is a top view of yet another variant of the integrated optical switch made according to this invention.

The variant embodiment of the optical switch shown in FIG. 6 is practically identical to that shown in FIGS. 2 and 3. Switch 100 comprises a main beam 101 defined by recess 102, and a secondary beam 103, the free end of which can move in the secondary recess 104. If there is no force applied on the main beam 101, the beam will be in the position shown as a chain dotted line. The solid line shows the main beam in a switched position. Note that the center line of the secondary beam 103 is not perpendicular to the center line of the main beam 101. The secondary beam 103 was also designed so that it will not deform during movement of the main beam. This implies that the connection point between the two beams does not deform. This feature is useful to prevent deformation of the optical microstructure moved by the main beam.

Figure 7:
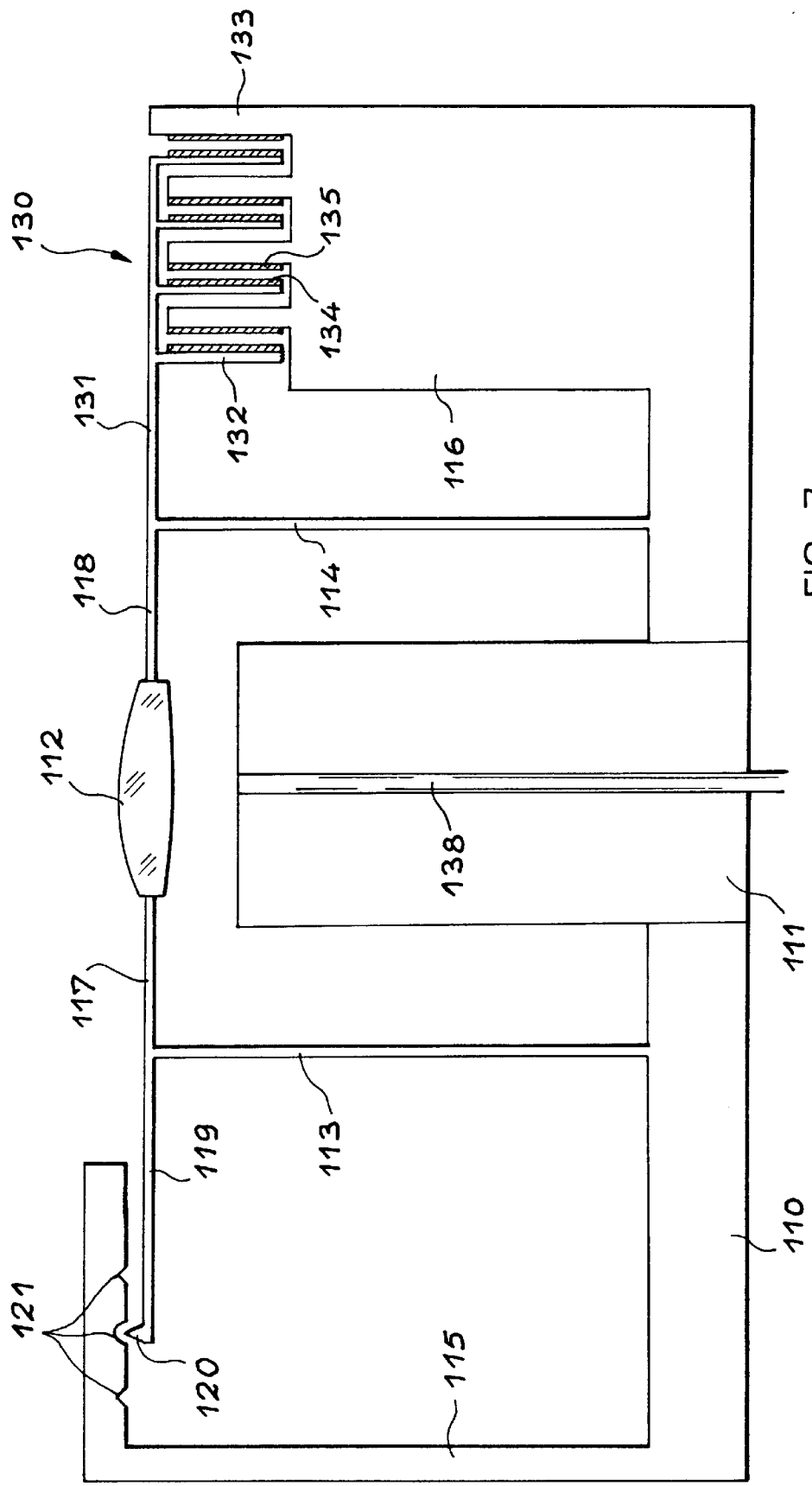
FIG. 7 is a top view of a device with an orientable lens made according to this invention.

The device shown in FIG. 7 was obtained by etching a substrate in the shape of a parallelepiped. The etching defined a part 110 acting as a support to which a central body 111, two main beams 113 and 114, a left extension 115 and a right extension 116 are connected. The etching also defined a cylindrical lens 112 connected by two symmetric arms 117 and 118 to the free ends of the main beams 113 and 114 respectively. The main beam 113 is extended by a secondary beam 119 along the center line of the arm 117. The free end of the secondary beam 119 comprises a male part 120 in the shape of a point centered on an axis parallel to the main beam 113. The male part 120 is engaged in one of the housings or female parts 121 with a shape corresponding to the male part 120 and etched in the terminal part of the left extension 115. The housing corresponding to the rest position is wider than the other housings so that the male part can be made.

The device also comprises an electrostatic control comb 130. The comb 130 comprises an arm 131 made during the etching and connected to the free end of the main beam 114. The arm 131 is extended perpendicularly by electrode holders 132. The right extension 116 is also terminated by electrode holders 133 alternating with electrode holders 132. Electrodes 134, 135 are deposited on electrode holders 132, 133 respectively. These electrodes are connected to a control voltage.

The upper surface of the central body 111 is provided with a groove into which an optical fiber 138 fits. This central body was etched so that the exit end of the optical fiber is centered on lens 112 in the rest position.

As in the previous examples, it can be understood that under the effect of an electrostatic force applied through the control comb 130, the optical microstructure composed of lens 112 can move relative to the exit from the optical fiber 138.

What is claimed is:

1. A system for positioning an optical microstructure having an optical axis in a device under the action of a control means, the system comprising:

a flexible element supporting the optical microstructure and connected to the device, the orientation of the flexible element with respect to the device being varied under the action of control means in order to put the optical microstructure in at least one determined position, the flexible element comprising at least one secondary beam movable along an edge of the device when the orientation of the flexible element varies, the secondary beam having one of a male part and a female part and said edge having the other of the male part and the female part, the male part and the female part beings adapted to engage each other under the effect of the flexibility element when the flexible element arrives at a determined position such that the flexible element is held at the determined position and immobilized with respect to the device when the control means no longer acts, and being adapted to disengage from each other under the effect of the control means such that the flexible element is released and re-mobilized with respect to the device.

2. Positioning system according to claim 1, in which the said male part and the said female part have axes of symmetry parallel to the optical axis of the optical microstructure.

3. Positioning system according to claim 1, in which the male part has a pointed cross section, the female part being a recess with a complementary shape.

4. Positioning system according to claim 1, in which the flexible element comprises a main beam having a first, free end and having a second end connected to the device.

5. Positioning system according to claim 4 in which the secondary beam is disposed transversely with respect to the main beam and is rigidly attached to the main beam.

6. Positioning system according to claim 5, in which the secondary beam is placed at the free end of main beam.

7. Positioning system according to claim 5, in which the secondary beam is fixed at one of its ends to the main beam, its other end being free and comprising one of the said male and female parts.

8. Positioning system according to claim 7, in which the secondary beam comprises the male part.

9. Positioning system according to claim 5, in which the secondary beam is such that it does not deform during displacement of the microstructure under the action of the control means.

10. Positioning system according to claim 1, in which the control means are capacitive means developing an electrostatic force in response to an electrical control voltage.

11. Positioning system according to claim 1, in which the control means are magnetic and/or piezoelectric means.

12. Positioning system according to claim 1, in which the control means cooperates with mechanical means to hold the flexible element.

13. Application of the positioning system according to claim 1 for the manufacture of an integrated optical switch, the optical microstructure being an optical microguide.

14. Application of the positioning system according to claim 1 for the manufacture of a device with a lens orientable into at least one determined position, the optical microstructure being the said lens.

15. Application of the positioning system according to claim 1, to the manufacture of an optical fiber device orientable into at least one determined position, the optical microstructure being the said optical fiber.

16. Application of the positioning system according to claim 1, for the manufacture of a device with a mirror orientable into at least one determined position, the optical microstructure being the said mirror.

17. Application of the positioning system according to claim 12 for the manufacture of an integrated optical switch, the optical microstructure being an optical microguide.

18. Application of the positioning system according to claim 12 for the manufacture of a device with a lens orientable into at least one determined position, the optical microstructure being the said lens.

19. Application of the positioning system according to claim 12, to the manufacture of an optical fiber device orientable into at least one determined position, the optical microstructure being the said optical fiber.

20. Application of the positioning system according to claim 12, for the manufacture of a device with a mirror orientable into at least one determined position, the optical microstructure being the said mirror.

* * * * *